US012662314B2

(12) United States Patent
Razumov

(10) Patent No.: US 12,662,314 B2
(45) Date of Patent: Jun. 23, 2026

(54) MATRIX-PICKING

(71) Applicant: MARTISTEL INNOVATION FZCO, Dubai (AE)

(72) Inventor: Sergey Razumov, Strovolos (CY)

(73) Assignee: MARTISTEL INNOVATION FZCO, Dubai (AE)

( * ) Notice: Subject to any disclaimer, the term of this patent is extended or adjusted under 35 U.S.C. 154(b) by 345 days.

(21) Appl. No.: 18/270,842

(22) PCT Filed: Jan. 3, 2022

(86) PCT No.: PCT/EP2022/050014
§ 371 (c)(1),
(2) Date: Jul. 4, 2023

(87) PCT Pub. No.: WO2022/148722
PCT Pub. Date: Jul. 14, 2022

(65) Prior Publication Data
US 2024/0067449 A1      Feb. 29, 2024

(30) Foreign Application Priority Data
Jan. 5, 2021      (EP) ..................................... 21150348

(51) Int. Cl.
B65G 1/04          (2006.01)
(52) U.S. Cl.
CPC ......... B65G 1/0492 (2013.01); B65G 1/0464 (2013.01); B65G 1/0478 (2013.01)
(58) Field of Classification Search
CPC ... B65G 1/0492; B65G 1/0464; B65G 1/0478
See application file for complete search history.

(56) References Cited

U.S. PATENT DOCUMENTS 11,542,096 B2 * 1/2023 Solovianenko ........ B65G 1/065
2017/0129703 A1 5/2017 Lindbo et al.
(Continued)

FOREIGN PATENT DOCUMENTS

WO        2012127102 A1      9/2012
WO        2019/103637          5/2019
(Continued)

OTHER PUBLICATIONS

International Search Report for International Application No. PCT/EP2022/050014, dated Mar. 15, 2022.
(Continued)

*Primary Examiner* — Saul Rodriguez
*Assistant Examiner* — Ashley K Romano
(74) *Attorney, Agent, or Firm* — Brett A. Schenck

(57)          ABSTRACT

The present invention relates to a system for storing and organizing materials comprising: at least a first tier, which comprises a plurality of storage places arranged in rows in two horizontal directions, perpendicular to each other, and serving to accommodate boxes; a plurality of boxes accommodated individually in these storage places, above the first tier at least partially an assembly area is provided; the assembly area comprises a first transport network, with a plurality of first rail tracks oriented horizontally along the first direction, adapted to accommodate mobile actuating devices along them for their transportation, a plurality of second rail tracks oriented horizontally along the second direction, the second rail tracks are arranged at least within or below the first tier and are adapted to accommodate mobile transporting devices within or below the first tier along the second rail tracks for their transportation.

20 Claims, 9 Drawing Sheets

(56) References Cited

U.S. PATENT DOCUMENTS

| | | | |
|---|---|---|---|
| 2019/0168964 A1* | 6/2019 | Lert, Jr. | B65G 1/065 |
| 2021/0047121 A1* | 2/2021 | Stevens | B65G 1/0492 |
| 2021/0171282 A1* | 6/2021 | Solovianenko | B65G 1/04 |
| 2021/0179364 A1* | 6/2021 | Zhang | B65G 61/00 |
| 2021/0237971 A1* | 8/2021 | Zhang | B65G 1/0428 |
| 2021/0269244 A1* | 9/2021 | Ahmann | B65G 1/0492 |
| 2022/0041372 A1 | 2/2022 | Austrheim | |

FOREIGN PATENT DOCUMENTS

| | | | |
|---|---|---|---|
| WO | 2019103637 A1 | 5/2019 |
| WO | 2019/238694 | 12/2019 |
| WO | 2019238694 A1 | 12/2019 |
| WO | 2020/127060 | 6/2020 |
| WO | 2020127060 A1 | 6/2020 |

OTHER PUBLICATIONS

Written Opinion of the ISA for International Application No. PCT/EP2022/050014, dated Mar. 15, 2022.

* cited by examiner

165

164

166    167

160

161

162    163

MATRIX-PICKING

The claimed invention relates to warehouse technology, in particular, to systems for automatic storage, sorting, picking and delivery of goods according to claim 1. The invention can find application in various automated storage facilities, distance selling systems (mail and Internet), as well as automated (automatic) retail stores (trade kiosks or pavilions).

Operations for storing goods, transporting them and retrieving them with the required content from the storage area, collecting them and preparing them for further processing. Bundling processes are the most time consuming and costly part of the e-commerce supply chain, which involves a large proportion of manual labor.

During the operation of the system, there is a need for storing boxes with goods, their delivery to a person—a buyer, a person—an operator or an automatic device in a certain sequence. So as to allow the buyer, operator or device to sequentially assemble the boxes necessary to complete the task. To carry out these processes, human-controlled technology is used, and manual labor is also used, which leads to a decrease in the storage density of goods in the storage system. As a result, an increase in its size is desirable for the system to function without manual labor in order to reduce operational costs and errors.

Known overhead robotic system for moving stacked objects, are described in published international application WO 2012/127102, B65G 1/04, 2012. The system includes a portal unit configured to move over objects located in the warehouse area. Also, a gripper is provided attached to the portal block and movable along the portal block. From WO/2019/103637 a Storage system is known which comprises a storage framework within which boxes are stacked directly on top of each other. Via laterally accessible rail tracks boxes can be moved between the storage space and a loading pedestal. Separate access to individual boxes within the storage space is not possible.

The main disadvantage of this system is its low efficiency due to the presence of only one capture.

There is a known item handling system described in the application US 2017/0129703, containing two perpendicular sets of rails forming a grid over a plurality of stacks of containers. The system also contains many of the first robotic loading devices for net-work over stacks of containers.

Each load loading device includes a housing mounted on wheels. A housing having a lifting means for lifting a container from a stack of containers. A first set of wheels configured to engage rails of a first set of rails. And a second set of wheels configured to engage the rails of the second set of rails. The first set of wheels is independently movable and steerable with respect to the second set of wheels. So, when moving, only one set of wheels will come into contact with the net at any given time, thereby allowing the devices to move the load along the rails, controlling only the set of wheels meshed with the rails, in which some of the stacks are configured to include containers with a larger cross-sectional area than the containers in the rest of the stacks.

In addition, the system comprises at least one second robotic cargo handling device for working on a mesh. and is configured to lift and move containers from within portions of stacks configured to include large containers.

The disadvantages of this system are the complexity of the robotic devices included in it and the impossibility of collecting the kits.

The technical object of the present invention is to expand the arsenal of technical means of automatic systems for storing materials and collecting sets from them by completely eliminating manual labor.

In addition, the technical result is also an increase in the productivity of the automatic system due to multi-threaded processing of boxes with materials and completing the set.

The following is a summary of the invention. Thus, it may contain simplifications, generalizations, inclusion and/or exclusion of details. Therefore, those skilled in the art should appreciate that this summary is illustrative only and is not intended to be limiting in any way.

According to the invention the technical task is solved by a system according to claim 1 which is a system for storing and organizing materials comprising:

at least a first tier, which comprises a plurality of storage places arranged in rows in two horizontal directions, perpendicular to each other, and serving to accommodate boxes; a plurality of boxes accommodated individually in these storage places, above the first tier at least partially an assembly area is provided; the assembly area comprises a second transport network, with a plurality of second rail tracks oriented horizontally along the second direction, adapted to accommodate mobile actuating devices along them for their transportation, a plurality of first rail tracks oriented horizontally along the first direction, the first rail tracks are arranged at least within or below the first tier and are adapted to accommodate mobile transporting devices within or below the first tier along the first rail tracks for their transportation; the plurality of mobile transporting devices are each adapted to accommodate at least one box and move the accommodated box along the respective first rail tracks towards, away and/or between the storage places of the tier with storage places are arranged adjacent to the first rail tracks.

According to the invention it is provided that each of the plurality of mobile actuating devices is provided with a gripper adapted to grab and transfer at least some content of a box of the first and/or any further tier arranged below the first tier, while such box and one of the mobile actuating devices are arranged above each other, that the mobile transporting devices are adapted to move perpendicular to the first rail track below the storage place for a box within the first and/or any further tier below the first tier.

According to the present invention a tier can be recognized as a (first) layer of box storage space of which several can be placed on top of each other (horizontally).

According to the present invention a storage place can be seen as an individual storage area for one or a group of storage units, in particular a box. An individually stored box can also be a group of boxes defining a subgroup of the total number of storable boxes.

According to the present invention the second transport network is preferably located on top of the tier which is located the highest of all arranged tiers. The second transport network is preferably provided as a top layer of the system.

According to the present invention the first rail tracks are part of each provided tier, are arranged within below or above each provided tier. In one embodiment several tiers may share the first rail tracks as an individual layer of the first rail tracks or a sum of layers of the first rail tracks.

According to the present invention a mobile transporting device is provided preferably for transportation purposes of boxes towards, away of between storage spaces. Preferably the mobile transporting device is moved along the first rail tracks.

According to the present invention mobile actuating devices are preferably located on the second rail tracks and/or are provided for transportation of goods from, between or into boxes.

According to a preferred embodiment there is at least one further tier that is arranged below the first tier. So, there can be at least two tiers, thus two layers of storage places within the system (or 3, 4, 5, 6, 7, 8, 9, 10, . . . layers).

According to a preferred embodiment the first rail tracks within a single tier are at least partially configured as a network of rail tracks. Thus, the first rail tracks can comprise tracks that are perpendicular and connected to each other.

According to a preferred embodiment tiers that are arranged on top of each other are connected by a delivery system that grants mobile transporting devices (located on one tier) access to another tier. This feature can be provided e.g., as an elevator or a slope connecting the individual tiers. Preferably, the delivery system is located adjacent to the stacked tiers and connected to the same.

According to a preferred embodiment the delivery system is provided in form of a ramp that connects the first rail tracks of one tier with the first rail tracks of at least one other tier, preferably all other tiers.

According to a preferred embodiment the first and second rail track(s) have at least one point of vertical intersection that gives a direct view from the first track to a second track below, allowing for transport and/or deployment of goods by a mobile actuating device to a mobile transporting device of the first tier, preferably also of any tier below the first tier.

According to a preferred embodiment the movement of mobile actuating devices and/or mobile transporting devices is fully automated.

According to a preferred embodiment a terminal is provided that inputs and outputs boxes from and to the system.

For a better understanding of the essence of the proposed technical solution, below is a description of a specific example of execution, which is not a limiting example of the practical implementation of an automatic system for storing materials and collecting sets of them. In accordance with the claimed invention with reference to the drawings, which show the following.

Figure 1:
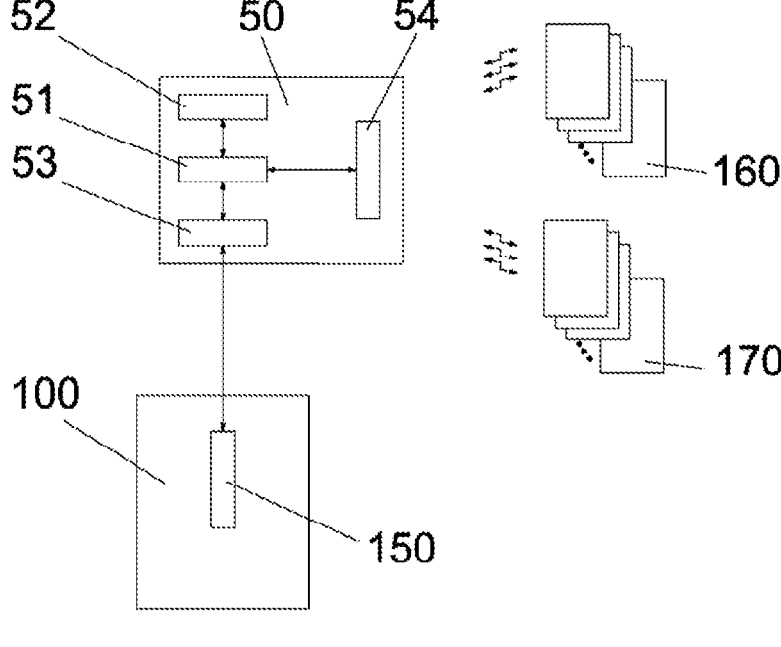
FIG. 1 is a general diagram of an automatic system.

It should be appreciated that only those details are shown in the drawings that are necessary to understand the essence of the proposal. Related equipment well known to those skilled in the art are not shown in the drawings.

Figure 2:
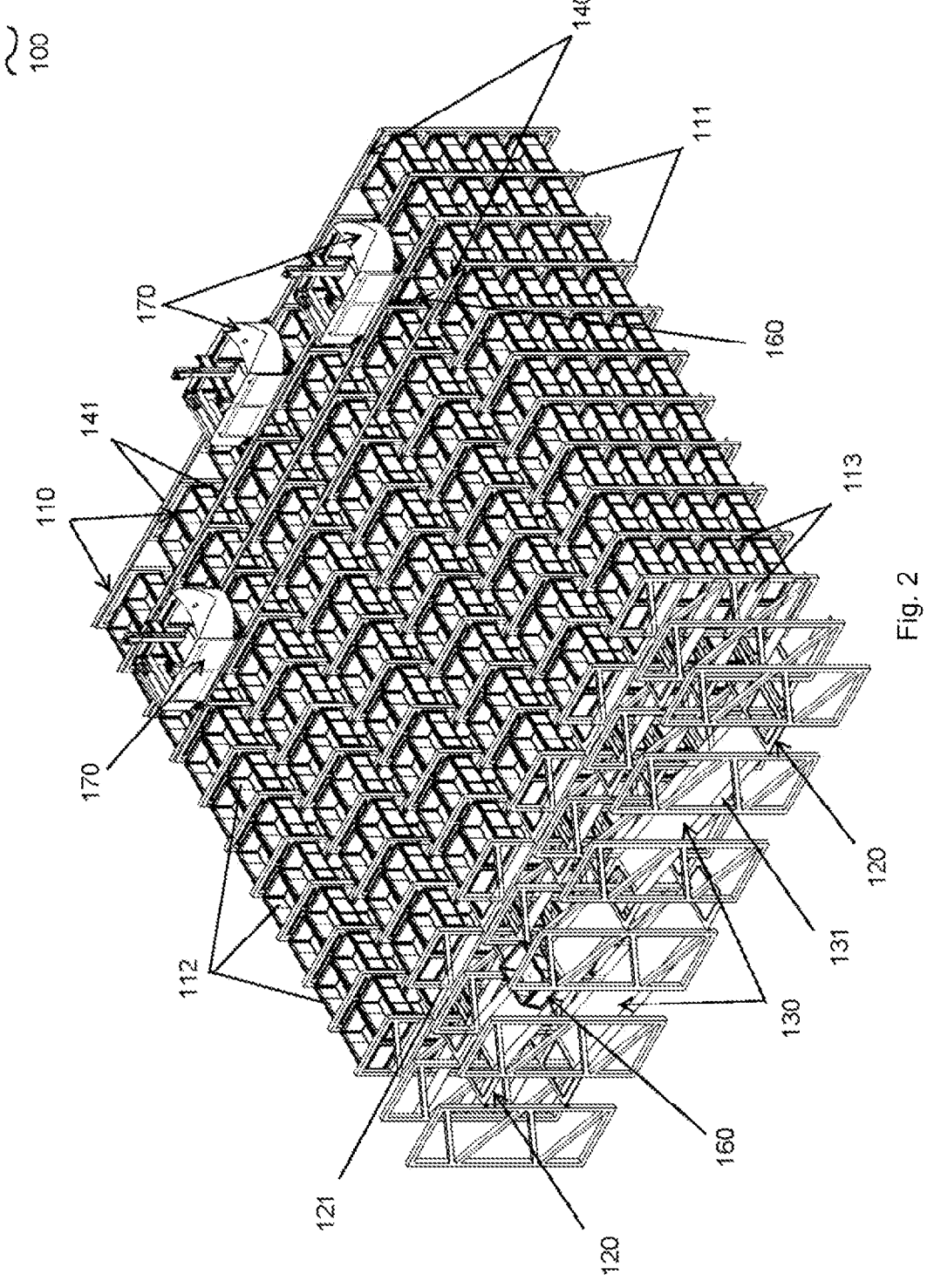
FIG. 2 is a first perspective view of an automatic system.
Figure 3:
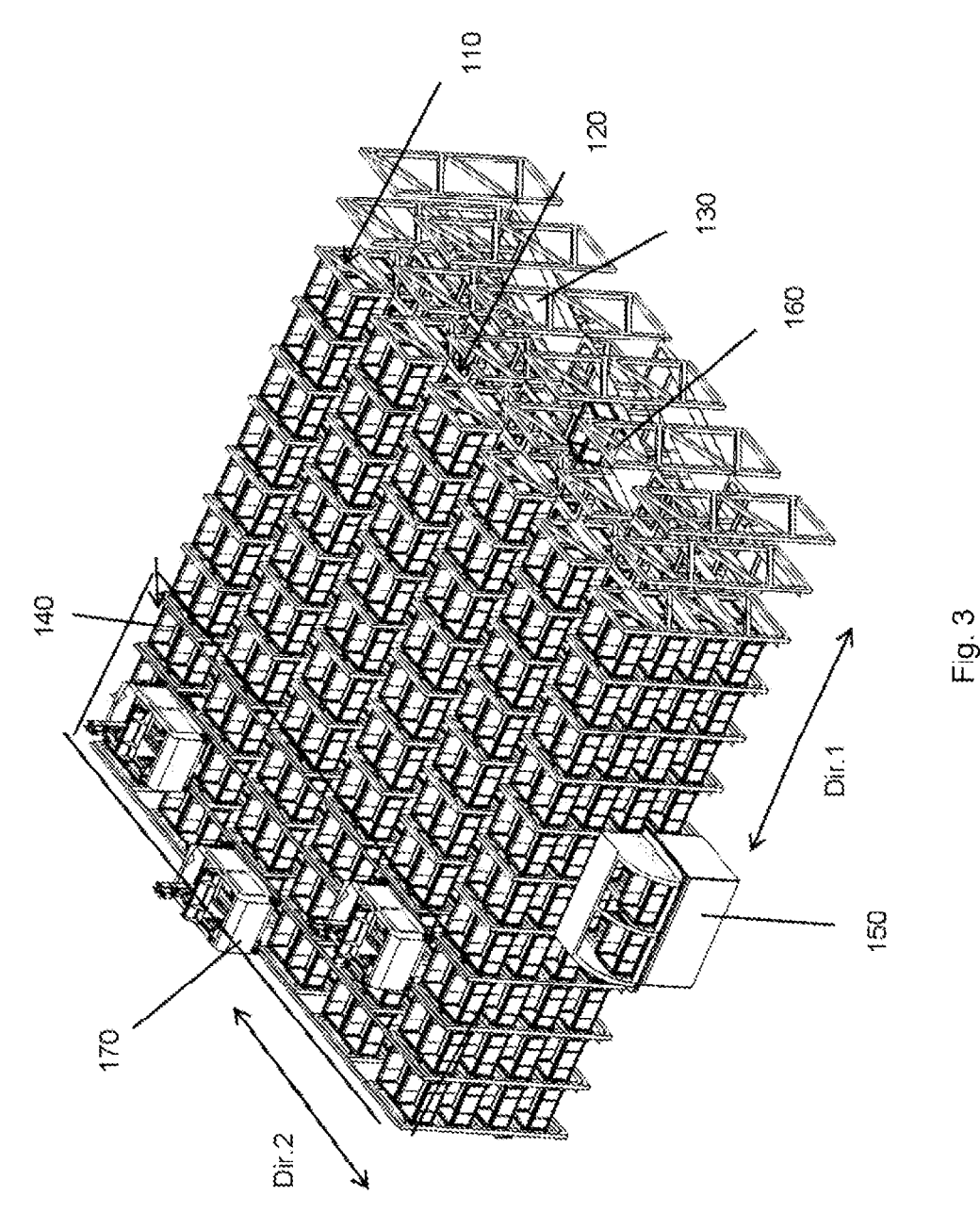
FIG. 3 is a second perspective view of an automatic system.

As shown in FIGS. 1 to 3, an automatic system for storing materials and collecting sets from them may comprise a control module 50 and/or a multi-level system 100. The control module 50 may comprise a central control processor 51 and/or an order processing unit 52 and/or interface 53 and/or a wireless interface 54.

The layered system 100 may comprise rack units 110 (storage places) and/or a first transport network 120 (first rail tracks) and/or a (group of) ramp(s) 130 and/or a second transport network 140 and/or a terminal 150 and/or transport mobile devices 160 (TMU) and/or executive mobile devices 170 (IMD).

Rack sections 110 may be frame structures 111 arranged preferably in rows in the first horizontal direction, preferably equipped with shelves 113, preferably made in the form of channels and/or arranged in horizontal rows along the rack sections one above the other. Thus, forming vertical levels for placing boxes 112 which are preferably installed on shelves 113 and/or designed to store various materials (goods, items). In an example, as shown in FIGS. 2 and 3, the number of rack units 110 along the first direction may be six, and the height of the sections n is may be four storage levels of the boxes 112. The top-level n (i.e., the 4th in this example) partially forms a picking area.

Obviously, the number of rack units and their length may be determined by the dimensions of the storage system and/or the total height of the rack units can vary depending on the specific purpose of the system. It may be determined by its overall performance.

The first transport network 120 may include a multi-level intersection driveway 121, which may provide the movement of the TMU 160 in the first horizontal direction, along the rack sections 110 as well as the exit and intersection in the second perpendicular direction. In addition, the transport network 120 may include the lower parts of the shelves 113. Along those, the TMU 160 can move in the second horizontal direction. Multilevel intersections 121 may be located under each storage level of boxes 112 and/or docked with shelves 113, preferably so as to provide TMU 160 access to any box 112 stored on a given horizontal storage level in preferably any rack section 110. The first transport network 120 may be shared with rack sections 110 provide storage for boxes 112 and/or for their capture and/or movement within the system using TMU 160. Moreover, taking and/or installing boxes 112 on shelves 113 is carried out by approaching TMU 160 under the box from below.

The ramp group 130 may be an inclined track 131 which may connect different levels of the first transport network 120 (first rail tracks) of rack sections 110 in such a way that the TMU 160 can preferably move along them similarly to horizontal movement in the second direction. The inclined track 131 may start and/or end directly from the multi-level intersection driveways 121 so that the beginning and end of one inclined track 131 may be at different levels of the transport network 120.

Preferably, the ramp group 130 may be designed to provide independent movement of at least one TMU 160 between all levels of the multi-level transport network 120. The combination of the ramp group 130 with the multi-level transport network 120 provides access to each TMU 160 to any box 112 located in the system 100.

The second transport network 140 is preferably designed to move the executive mobile devices 170 through it which are preferably designed to handle the contents of boxes 112, located directly below the transport network 140. The executive mobile devices 170 is located, preferably above the upper-level n of the system. The second transport network may comprise at least one parallel pair of tracks 141 which are preferably placed above the frame structures 111 so as to provide unimpeded access from above to the contents of the boxes 112 preferably arranged on the shelves 113 or transported on the TMU 160 under them. The preferred location of the second transport network 140 is generally possible at any height which is sufficient for transport mobile devices 160 with boxes 112 installed on them to pass under it along the first transport network 120.

Obviously, the number of tracks 141 and their length is determined by the size of the warehouse system and is mainly determined by its overall capacity. It is also obvious that a pair of tracks 141 can be at such a distance from each other to allow one IMU 170 to access more than one row of storage boxes 112 in the first horizontal direction.

Terminal 150 is preferably designed to input and output boxes 112 and their contents to system 100. Terminal 150 is preferably located at a comfortable height for use, e.g. by a person, thus at ground level or up to 2 m. The terminal can be located on either side of the system 100, including the side of the ramps 130. In the proposed example, the terminal is preferably docked from the back of the system to the outermost section 110 approximately in the middle of it in the first horizontal direction. The transfer of boxes 112 to the terminal is preferably carried out from the first or second level of the first transport network 120 using the TMU 160. The terminal can be controlled from the system control module 50 via the wired interface 53.

Figure 4:
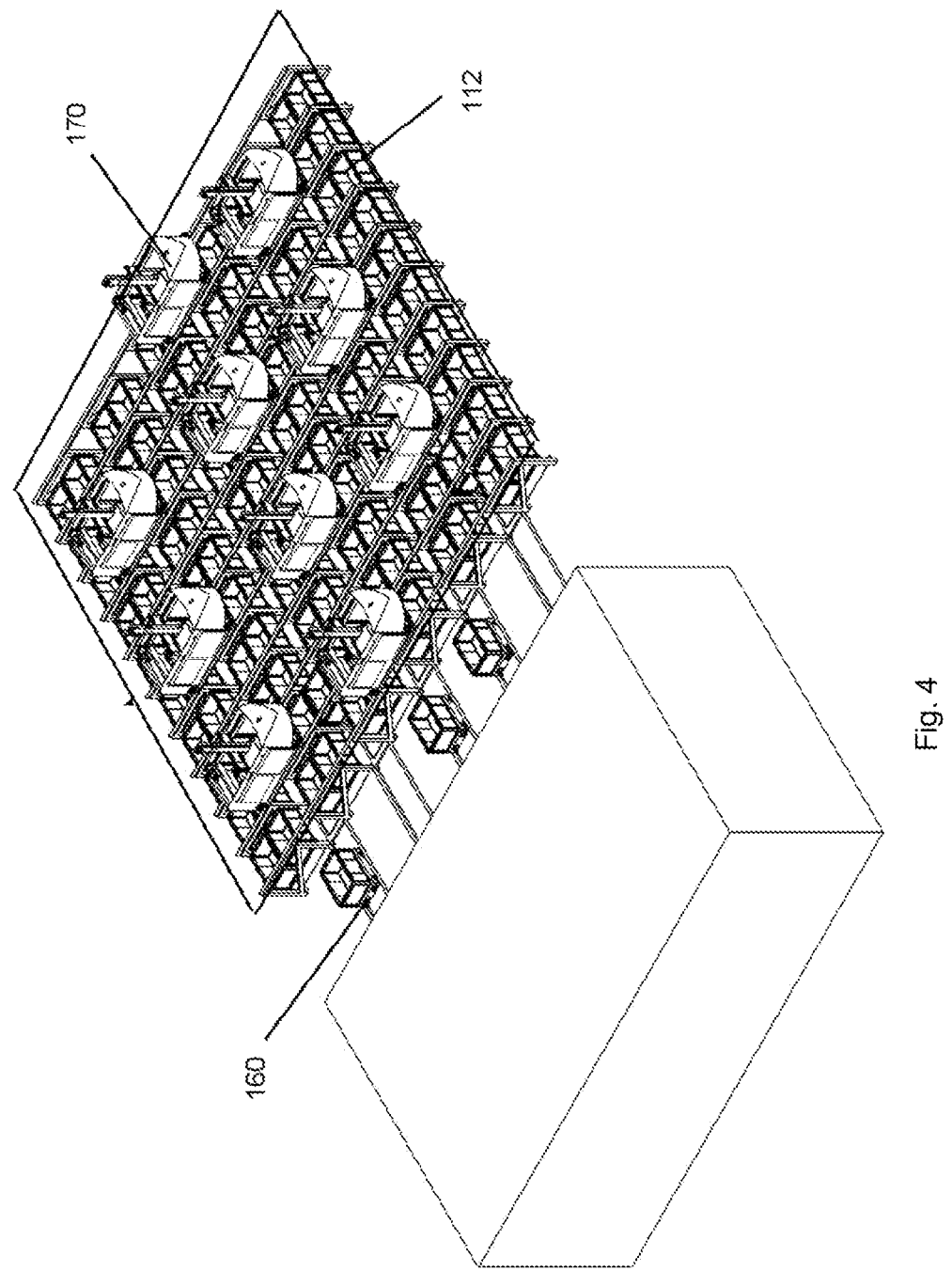
FIG. 4 shows a variant of placing the picking area separately from the storage area, perspective view.

FIG. 4 depicts one of the embodiments of the described invention, in which the picking area (100) is preferably located separately away from the storage area. It can be seen that the storage area can be arbitrary, and include various transport devices. In order to provide the picking method described according to the present invention, it may be necessary to transport the boxes 112 between storage and picking areas, for example using transport mobile devices 160 or in some other way.

As can be seen in the figure, this option may be to separate the picking area from the storage area. This option provides a huge potential for the application of this invention with existing warehouses equipped with a variety of devices and also does not restrict the extension of the invention only to a certain type of warehouse. Which is equipped in accordance with the described in the application a single example of implementation of the invention.

Transport mobile devices 160 may be designed to self-pick and/or install at least one box 112 from the shelves 113 and/or transport them along the first transport network 120 and/or groups of ramps 130 between any two storage locations of the boxes in the system and to the terminal 150.

Figure 5:
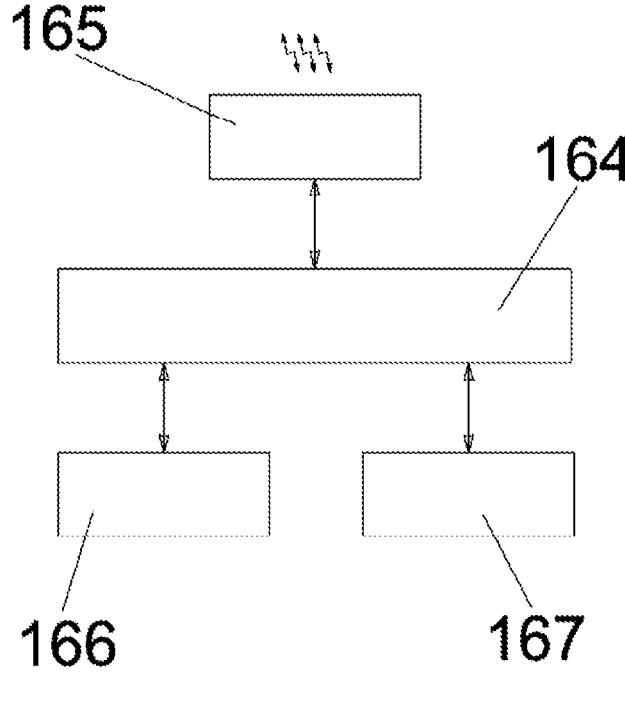
FIG. 5 is a schematic diagram of a transport mobile device.
Figure 6:
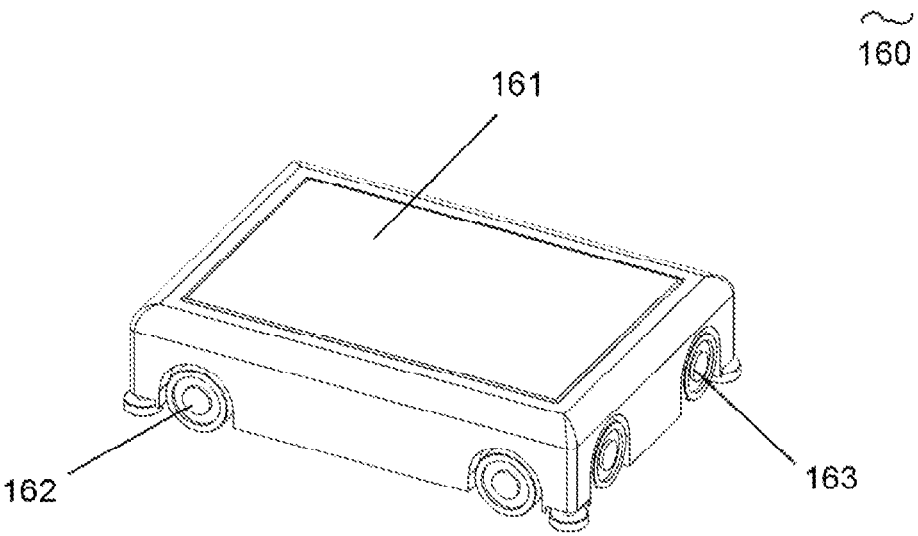
FIG. 6 is a general view of a transport mobile device (mobile transporting device—TMU).

As shown in FIGS. 5 and 6, the transport mobile device 160 may include a lift table 161 which may be designed to accommodate and/or transport the box 112. It may comprise two groups of drive wheels 162 and 163 which may be designed to interact with the railways of the first transport network 120. Groups of wheels 162 and 163 may have the ability to move vertically relative to each other, alternately being leading. Thus, a group of wheels 162 may serve to move the device in a first horizontal direction and/or the group of wheels 163 in the second horizontal direction and/or for moving along the ramps 130.

The structure of the TMU 160 may be made in such a way that an empty device with a lifting table 161 in the lower position, without a box 112 on the lifting table, can travel in a second horizontal direction along the shelves 113 with boxes 112 standing there, below/under the shelved boxes.

The transport mobile device can be controlled in any known manner. In particular, an embedded industrial controller 164 can be used for control, which has preferably a wireless interface 165 for communication with the central processor 51 of the automatic system. The controller 164 may control the drivers 166 for the drives of the wheels 162 and/or 163 to travel along the track of the first transport network 120 preferably in two directions and/or the driver 167 of the vertical position of the wheels 162, 163 and/or the state of the lift table 161.

Figure 7:
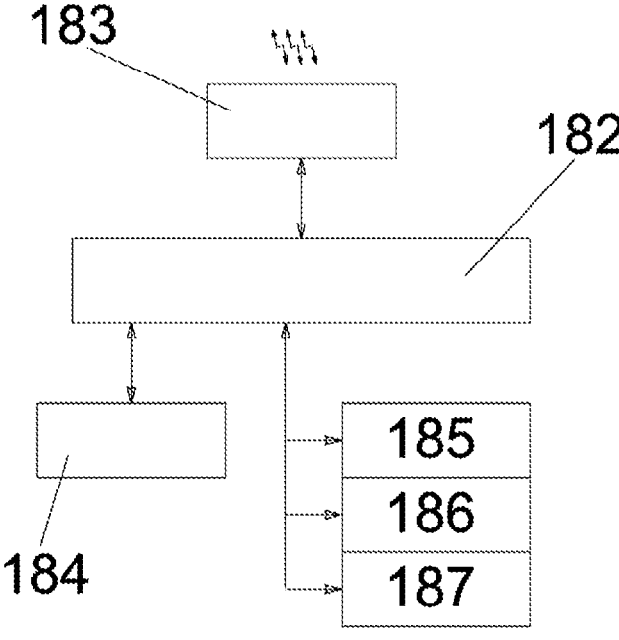
FIG. 7 is a schematic diagram of an executive mobile device.
Figure 8:
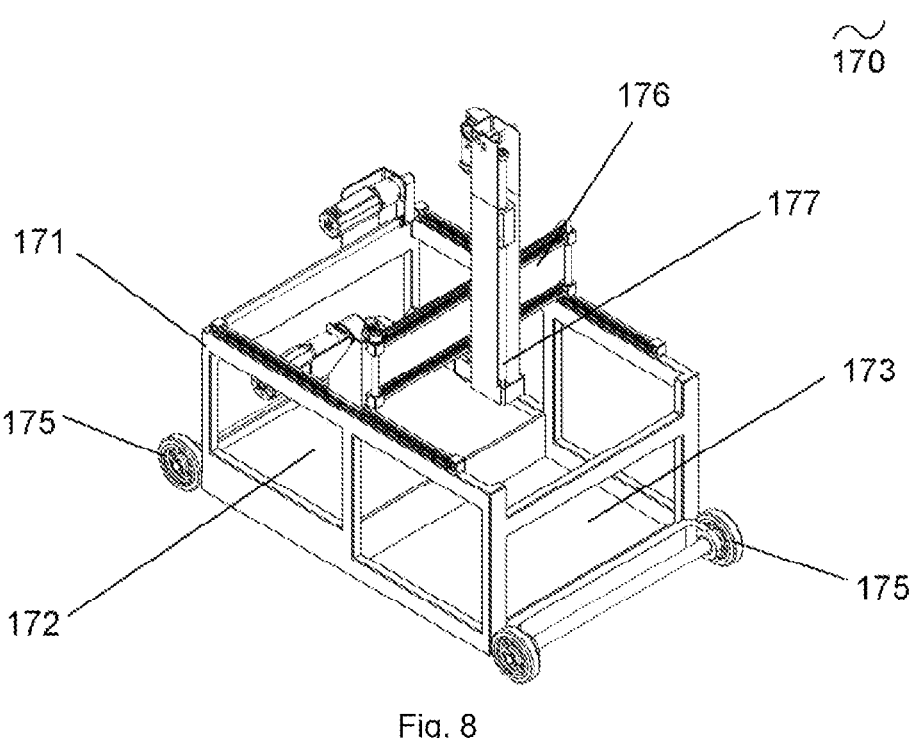
FIG. 8 shows an executive mobile device (mobile actuating device—IMD) in a transport position.
Figure 9:
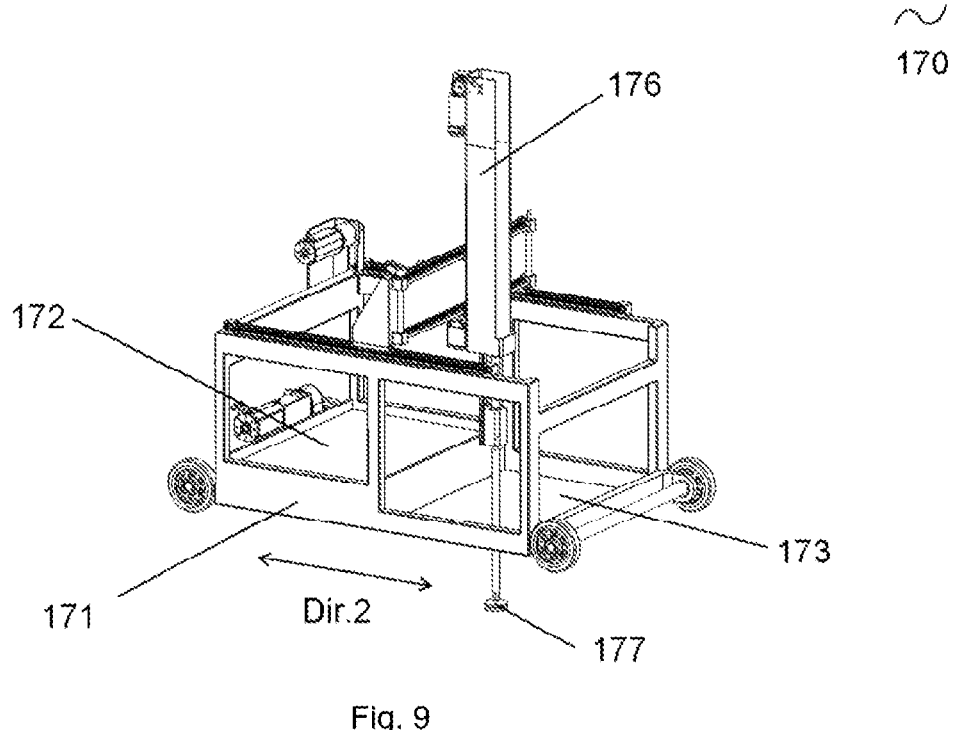
FIG. 9 shows a mobile actuator in a working position.

As shown in FIGS. 7, 8 and 9, the executive mobile device 170 may comprise a housing 171 having a transport platform 172 which may be designed to accommodate materials while moving and/or a window 173 that provides access to the contents of the boxes 112 underneath the device. In addition, the mobile device 170 may include marching wheels 175.

These wheels may be designed to interact with the track 141 of the second transport network 140. The mobile device 170 may include a 3-axis manipulator 176 with a gripper 177 (e.g., pneumatically actuated).

The executive mobile device 170 can also be controlled in any known manner. In particular, a built-in industrial controller 182 can be used for control, which may have a wireless interface 183 for communication with the central processor 51 of the automatic system. The controller 182 may control the drivers 184 of the wheel drives 175 for movement on the second track 141 and/or for precise positioning relative to the boxes 112, preferably standing directly under the second transport network 140. Also, the controller 182 may control the drivers 185, 186 and 187 of the movement of the manipulator 176 with the gripper 177.

The manipulator 176 may have a machine vision system for accurately positioning the gripper 177 relative to the desired material. The material may be located in the boxes 112 or on the transport platform 172. The design of the manipulator 176 may be made in such a way that the gripper 177 can be lowered to the first storage level of the boxes 112 (in this particular example, the fourth level, counting from the bottom), for example with a telescopic rod. The processing of data from the machine vision system and/or control of the manipulator 176 with the gripper 177 may be carried out by the controller 182.

Obviously, the width and length of the body 171 of the actuator 170 may provide simultaneous access to the three-axis manipulator 176 with the gripper 177 to several boxes 112 at once. The boxes can be placed under the track 141 corresponding to the body 171 in both the first and second horizontal directions.

The initial loading of an automatic storage system can be carried out in different ways depending on its purpose. For example, terminal 150 can fill the system while it receives palletized materials from suppliers.

In this case, the system boot process may include the following sequence of actions:

Step 301: As previously indicated, personnel may fill empty boxes installed on the shelves of terminal 150 and/or through interface 53 transmits readiness information to the central processor 51.

Step 302: Preferably upon command from the central processor 51, preferably received via the wireless interface 165, the controller 164 of the transport mobile device 160 may control the drives 166 of the wheels 162 and 167 for the vertical position of the wheels and/or the state of the lift table. The control as such may be such that the transport mobile device 160 moves along the shelf of the terminal 150 under the target box 112 and/or takes it over, and/or moves through the first transport network 120 and/or groups of ramps 130. If necessary, to the storage location of the target box in the system 100, placing it on it. Then, through the wireless interface 165, it preferably transmits a report on the completion of the task to the processor to the central processor 51.

Step 303: Preferably on commands from the CPU 51 received via wireless interface 165, the controller 164 of the transport mobile device 160 may control the drives 166 of the wheels 162 and 167 of the vertical position of the wheels. The controller 164 of the transport mobile device 160 may also control the state of the lift table so that the transport mobile device 160 may approach an empty target box 112 which is on shelves 113 somewhere in the storage system takes it on board and/or moves it to terminal 150 and/or leaves it on the shelf of the terminal to continue the boot process.

Step 304: Steps 301-303 may be repeated until the storage locations of the system 100 are filled to the desired level.

Similar to the system boot process, it unloads from the system with the preferred difference that TMU 160 bring boxes 112 with goods to terminal 150 and/or returns them to the storage system, preferably empty. The rest of the algorithm may be as described above.

Figure 10:
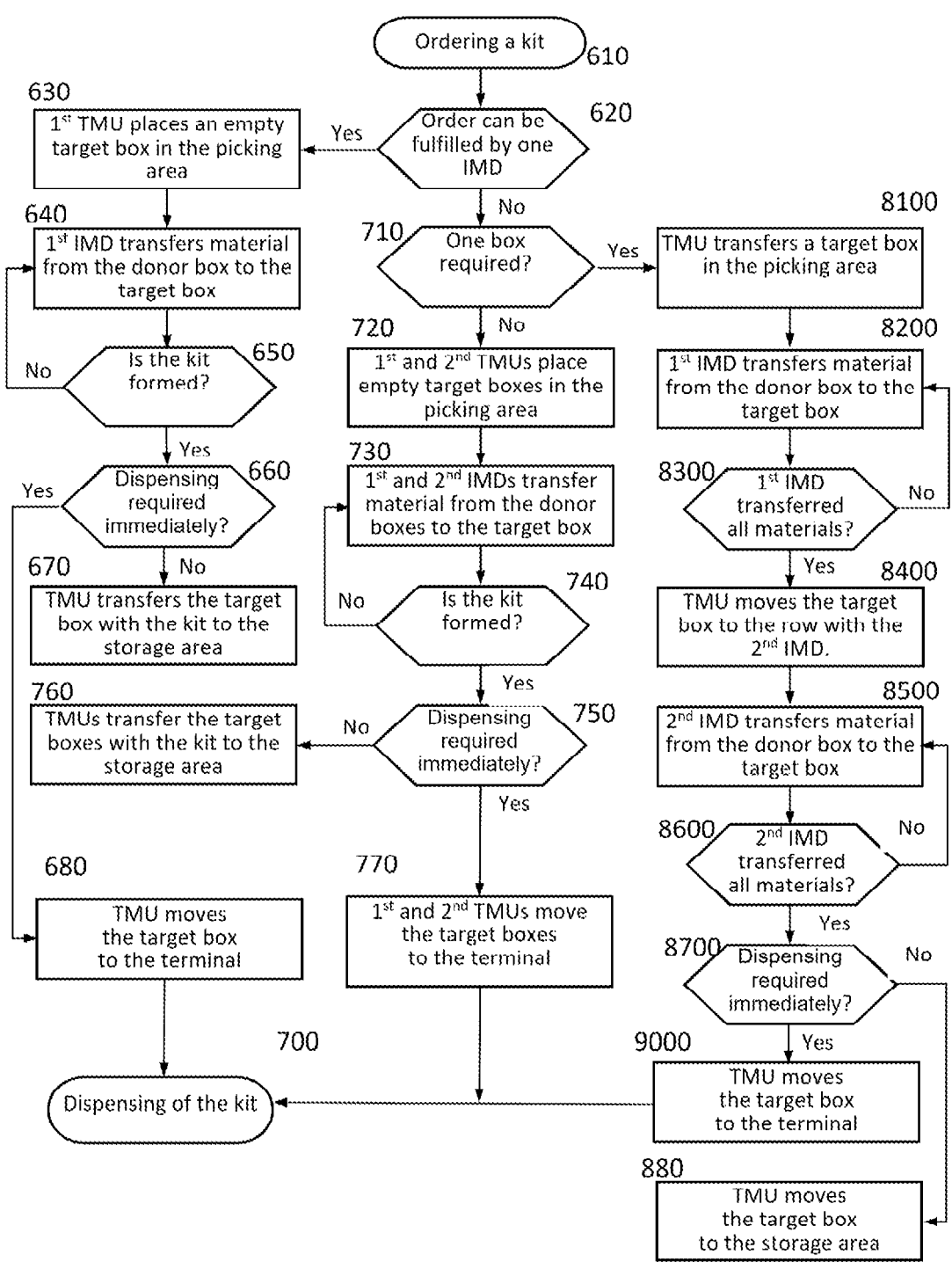
FIG. 10 is a generalized block diagram of system operation.

A generalized kit formation process is depicted in block diagram form in FIG. 10.

Step 610: The order processing unit 52 of the control module 50 may receive information about the need to generate a set of materials.

Step 620: Based on the information received, the central processor 51 may determine the ability to fulfill the order with one first executive mobile device (IMD). that is, whether all ordered materials are in its picking area. If possible, step 630 is performed, otherwise, step 710 is performed.

Step 630: The first transport mobile device 160 may place an empty target box 112 on the upper storage level in the picking area of the first IMD 170.

Step 640: After the empty target box is installed, the first executive mobile device 170 may proceed to build the kit by transferring materials from the donor boxes to the target box. To do this, preferably follow at least some of the following steps:

Step 641: The controller 182 of the first executive mobile device 170 may be on commands from the central processor 51. The commands may be received via wireless interface 183 and/or may control the drives 184 of the wheels 175 such that the mobile device 170 moves along the second track 141 and is positioned by the window 173 exactly above the box 112 with the first ordered material. In this case, this box must be in the picking area.

Step 642: Controller 182 may control the actuators 185, 186 and 187 of the vision arm 176 to position the gripper 177 over the desired material in the donor box.

Step 643: Manipulator 176, using gripper 177, may take material from the box and move it to transport platform 172.

Step 644: The controller 182 may control the wheel drives 184 such that the mobile device 170 moves along the second track 141 and is positioned by the window 173 (exactly) over the target acceptor box 112.

Step 645: Manipulator 176 uses gripper 177 to take material from transport platform 172 and to transfer it to the ordered kit box in a box located on shelves 113, located in the picking zone of the first IMU 170. If necessary, picking in a box is also possible which is located on the transport mobile device 160, standing in the picking area of the IMU 170.

Step 650: Next, a check may be performed that the bundling has been completed. The check can be performed by both the central processor 51 and/or the controller 182 of the first executive mobile device. If the kit is formed (check positive), then step 660 is performed, if not, then step 640.

Step 660: Determine whether to dispense the generated kit. If the delivery of the kit is required immediately, then step 680 is performed, if not, then step 670 is performed.

Step 670: Transport mobile device 160 may move the assembled box to the temporary storage area.

Step 680: Transport mobile device 160 moves the assembled box to terminal 150.

Step 700: The formed set of materials (kit) is taken from the box in the terminal 150 or, if necessary, the box with the whole set is taken.

Step 710. The central processor 51 of the automatic system may determine the number of boxes required to fulfill the order. If one box is required, then step 810 is performed, if more boxes are required, then step 720.

Step 720: The first and second transport mobile devices 160 may place empty target boxes 112 as close as possible to the midpoints of the respective picking areas.

Step 730: After the empty target boxes are installed, the first and second executive mobile devices 170 begin to build the kit by transferring materials from the donor boxes to the target boxes. In this case, actions similar to steps 641-645 are performed for each executive mobile device.

Step 740: Next, a check can be made that the bundling has been completed. If the set is formed (check positive), then step 750 is performed, if not, then step 730 is performed.

Step 750: Preferably determine whether to dispense the generated kit. If the dispensing of the kit is required immediately, then step 770 is performed, if not, then step 760 is performed.

Step 760: The first and second transport mobile devices 160 preferably move the assembled boxes to the temporary storage area.

Step 770: The first and second transport mobile devices 160 may move the assembled boxes to the terminal 150.

Step 700 may be performed.

Step 810: The first transport mobile device 160, upon command from the CPU 51, may take an empty target box 112. Target box 112 may be intended for placing ordered materials in the picking area of the first executive mobile device 170.

Step 820: The first executive mobile device 170 may proceed to form the kit by transferring materials from the donor boxes to the target box on board the TMU 160. This is done in the same way as in steps 641 through 645.

Step 830: Next, a check may be conducted that the bundling has been completed. If the first executive mobile device 170 has transferred all of the materials, then step 840 is performed, if not, then step 820.

Step 840: Upon completion of the operation of the first executive mobile device 170, the transport mobile device 160, upon command of the central processor 51, may move the target box to the row with the second executive mobile device 170.

Step 850: After the target box has been moved, the second executive mobile device 170 may proceed to build the kit by transferring materials from the donor boxes to the target box. This performs the same steps as steps 641 through 645.

Step 860: Next, a check may be conducted that the bundling has been completed. If the second executive mobile device 170 has transferred preferably all of the materials (complete formation of the package), then step 870 is performed, if not, then step 850.

Step 870: Determine whether to dispense the generated kit. If dispensing the kit is required (immediately), then step 900 is performed, if not, then step 880 is performed.

Step 880: Transport mobile device 160 preferably moves the assembled box to the temporary storage area.

Step 900: Transport mobile device 160 preferably moves the assembled box to terminal 150.

Step 700 is performed.

During the operation of the claimed system, a situation may arise in which a significant proportion of the work on the formation of orders will fall on one executive mobile device 170 while the rest of the executive mobile devices 170 will be idle. To ensure that all devices in the system are loaded evenly, the following steps are taken.

A portion of the donor boxes from the picking area of the first "overloaded" executive mobile device 170 may be transported by means of transport mobile devices 160 to the picking areas of other, "underloaded" executive mobile devices 170. After that, other executive devices 170 begin to operate with their contents, thus thereby, unloading the "overloaded" device 170, parallelizing the work.

In the system, the stored materials may be ranked as popular (that is, which are in constant high demand) and slow (not often ordered). Popular materials are stored in the upper storage levels of the system, slow moving materials— in the lower ones. Since there is no point in storing slow-moving materials in the picking areas due to their rare use in ordered sets direct picking may be carried out from the boxes containing them, with an instant reverse movement of them back "to the bottom" of the system.

To this end, the transport mobile device 160 may take on board a box of slow goods from one of the lower storage levels of the system. Moves it to the picking area of one of the executive mobile devices 170 without unloading and/or after the picking process, returns it to its place, down.

While various aspects of carrying out the claimed invention have been described herein, those skilled in the art will appreciate that other approaches to carrying out the present invention are possible. The various aspects and implementation of the present invention are set forth herein for illustrative purposes and are not intended to be limiting. moreover, the scope of protection of the present invention is indicated in the following claims.

While not always expressed directly all of the above-mentioned method steps are meant to be optional and can be taken in any (sub-)combination in order to represent a feasible embodiment of the present invention. The person skilled in the art will appreciate that certain method step, while articulated as part of a working embodiment are not necessary to portray a working storage and "kit" assembly method and are purely optional to such means.

According to a preferred embodiment it is provided that mobile transporting devices in an empty state without a box is adapted to slip below a storage place in an occupied state of the storage space to move from one side of such box in the storage space to its opposite side which may be understood as an alternative wording for "mobile transport devices by themselves are adapted to pass through below a stored box in a storage place on the first transport network".

The invention claimed is:

1. A system for storing and organizing materials comprising:
   at least two tiers (100) arranged on top of each other, each comprising a plurality of storage places arranged in rows in two horizontal directions perpendicular to each other, a plurality of boxes accommodated individually in the storage places and at least two of the tiers comprising the storage places;
   a first transport network (120) with a plurality of first rail tracks (121) crosswise connected and horizontally arranged within each tier, wherein the first rail tracks are adapted to accommodate mobile transporting devices (160) for their transportation;
   wherein each of the plurality of mobile transporting devices (160) is adapted to pick up, accommodate, and transport a box from a storage place and move the box along the respective first rail tracks (121) towards or away from or between the storage places of the tier (100), or any combination of these directions, wherein the mobile transporting devices are configured to carry the box while passing completely through the corresponding storage place from one side to the opposite side, wherein the first transport network of each tier is provided below the position of a storage place; and
   an assembly area provided at least partially above the first tier (100), wherein the assembly area comprises a second transport network (140), with a plurality of second rail tracks (141) oriented horizontally and parallel to each other, adapted to accommodate mobile actuating devices (170) along them for their transportation, wherein each of the plurality of mobile actuating devices (170) is provided with a gripper adapted to grab and transfer a box or at least some content thereof within the first tier, any further tier arranged below the first tier, or any combination of the tiers, while such box and one of the mobile actuating devices (170) are arranged above each other, wherein each of the mobile transporting devices is configured to hold the box stationary below the assembly area such that the box becomes temporarily stored on the mobile transporting device, enabling the mobile actuating device (170) to access the contents of the box while it remains on the mobile transporting device.

2. System according to claim 1, wherein first rail tracks (121) of a single tier are at least partially interlinked such that the mobile transporting devices (160) can move along more than one of the first rail tracks (121) and between those rail tracks.

3. System according to claim 1, wherein tiers that are arranged on top of each other are connected by a delivery system that grants mobile transporting devices (160) located on one tier access to another tier.

4. System according to claim 1, wherein the second (141) and first rail track(s) (121) have at least one point of vertical intersection that gives a direct view from the second rail track to a first rail track, allowing for transport or deployment of goods by a mobile actuating device (170), or any combination thereof to/from a mobile transporting device (160) of the first tier, and of any tier below the first tier.

5. System according to claim 1, wherein the movement of mobile actuating devices (170) or mobile transporting devices (160) or any combination thereof is fully automated.

6. System according to claim 1, wherein a terminal (150) is provided that inputs and outputs boxes from the system.

7. System of claim 1, wherein the system is configured to perform a method of storing and organizing materials by:
   transporting boxes by one or more mobile transporting devices (160); and
   organizing or assembling contents of the boxes by the mobile actuating devices (170).

8. System according to claim 1 further comprising a manipulator (176) dimensioned such that it can simultaneously access two or more adjacent storage boxes, within the first tier or any further tier arranged below the first tier, and exchange the contents of the adjacent boxes via a gripper or manipulator, without relocating the manipulator.

9. System according to claim 1 further comprising a connecting transport system configured to allow the mobile transporting devices to move independently between the tiers of the storage system, enabling transfer of boxes between different levels without manual intervention.

10. System according to claim 1, wherein first rail tracks (121) of a single tier are at least partially interlinked such that the mobile transporting devices (160) can move along more than one of the first rail tracks (121) and between those rail tracks, wherein tiers are arranged on top of each other and are connected by a delivery system that grants mobile transporting devices (160) located on one tier access to another tier, wherein the second and first rail tracks have at least one point of vertical intersection that gives a direct view from the second rail track to a first rail track, allowing for transport or deployment of goods by a mobile actuating device (170), or any combination thereof to/from a mobile transporting device (160) of the first tier, and of any tier below the first tier, wherein the movement of mobile actuating devices (170) or mobile transporting devices (160) or any combination thereof is fully automated, wherein a terminal (150) is provided that inputs and outputs boxes from the system.

11. System according to claim 10, further comprising a connecting transport system configured to allow the mobile transporting devices to move independently between the tiers of the storage system, enabling transfer of boxes between different levels without manual intervention.

12. System according to claim 10 further comprising a manipulator (176) dimensioned such that it can simultaneously access two or more adjacent storage boxes, within the first tier or any further tier arranged below the first tier, and exchange the contents of the adjacent boxes via a gripper or manipulator, without relocating the manipulator.

13. A system for storing and organizing materials comprising:
    at least two tiers (100) arranged on top of each other, each comprising a plurality of storage places arranged in rows in two horizontal directions perpendicular to each other, a plurality of boxes accommodated individually in the storage places and at least two of the tiers comprising the storage places;
    a first transport network (120) with a plurality of first rail tracks (121) crosswise connected and horizontally arranged within each tier, wherein the first rail tracks are adapted to accommodate mobile transporting devices (160) for their transportation;
    wherein each of the plurality of mobile transporting devices (160) is adapted to pick up and accommodate at least one box from a storage place and move the accommodated box along the respective first rail tracks (121) towards or away from or between the storage places of the tier (100), or any combination of these directions, wherein the mobile transporting devices are configured to carry the box while passing completely through the corresponding storage place from one side to the opposite side, wherein the first transport network of each tier is provided below the position of a storage place;
    an assembly area provided at least partially above the first tier (100), wherein the assembly area comprises a second transport network (140), with a plurality of second rail tracks (141) oriented horizontally and parallel to each other, adapted to accommodate mobile actuating devices (170) along them for their transportation, wherein each of the plurality of mobile actuating devices (170) is provided with a gripper adapted to grab and transfer at least some content of a box within the first tier, any further tier arranged below the first tier, or any combination of the tiers, while such box and one of the mobile actuating devices (170) are arranged above each other; and
    a connecting transport system configured to allow the mobile transporting devices to move independently between the tiers of the storage system, enabling transfer of boxes between different levels without manual intervention.

14. The system of claim 13, wherein the connecting transport system comprises at least one inclined track, ramp, or lifting platform facilitating the movement of the mobile transporting devices between tiers.

15. System according to claim 13, wherein the connecting transport system comprises a ramp facilitating the movement of the mobile transporting devices between tiers, wherein the ramp connects the first rail tracks (121) of one tier with the first rail tracks (121) of one or more of the other tiers.

16. System according to claim 13, wherein first rail tracks (121) of a single tier are at least partially interlinked such that the mobile transporting devices (160) can move along more than one of the first rail tracks (121) and between those rail tracks, wherein tiers are arranged on top of each other and are connected by a delivery system that grants mobile transporting devices (160) located on one tier access to another tier, wherein the second (121) and first rail track(s) (121) have at least one point of vertical intersection that gives a direct view from the second rail track to a first rail track, allowing for transport or deployment of goods by a mobile actuating device (170), or any combination thereof to/from a mobile transporting device (160) of the first tier, and of any tier below the first tier, wherein the movement of mobile actuating devices (170) or mobile transporting devices (160) or any combination thereof is fully automated, wherein a terminal (150) is provided that inputs and outputs boxes from the system.

17. System according to claim 16, wherein the connecting transport system comprises a ramp facilitating the movement of the mobile transporting devices between tiers, wherein the ramp connects the first rail tracks (121) of one tier with the first rail tracks (121) of one or more of the other tiers.

18. A system for storing and organizing materials comprising:
    at least two tiers (100) arranged on top of each other, each comprising a plurality of storage places arranged in rows in two horizontal directions perpendicular to each other, a plurality of boxes accommodated individually in the storage places and at least two of the tiers comprising the storage places;
    a first transport network (120) with a plurality of first rail tracks (121) crosswise connected and horizontally arranged within each tier, wherein the first rail tracks are adapted to accommodate mobile transporting devices (160) for their transportation;
    wherein each of the plurality of mobile transporting devices (160) is adapted to pick up and accommodate at least one box from a storage place and move the accommodated box along the respective first rail tracks (121) towards or away from or between the storage places of the tier (100), or any combination of these directions, wherein the mobile transporting devices are configured to carry the box while passing completely through the corresponding storage place from one side to the opposite side, wherein the first transport network of each tier is provided below the position of a storage place;

an assembly area provided at least partially above the first tier (100), wherein the assembly area comprises a second transport network (140), with a plurality of second rail tracks (141) oriented horizontally and parallel to each other, adapted to accommodate mobile actuating devices (170) along them for their transportation, wherein each of the plurality of mobile actuating devices (170) is provided with a gripper adapted to grab and transfer at least some content of a box within the first tier, any further tier arranged below the first tier, or any combination of the tiers, while such box and one of the mobile actuating devices (170) are arranged above each other; and a manipulator (176) dimensioned such that it can simultaneously access two or more adjacent storage boxes, within the first tier or any further tier arranged below the first tier, and exchange the contents of the adjacent boxes via a gripper or manipulator, without relocating the manipulator.

19. System according to claim 18 further comprising a connecting transport system configured to allow the mobile transporting devices to move independently between the tiers of the storage system, enabling transfer of boxes between different levels without manual intervention.

20. System according to claim 18, wherein first rail tracks (121) of a single tier are at least partially interlinked such that the mobile transporting devices (160) can move along more than one of the first rail tracks (121) and between those rail tracks, wherein tiers are arranged on top of each other and are connected by a delivery system that grants mobile transporting devices (160) located on one tier access to another tier, wherein the second (121) and first rail track(s) (121) have at least one point of vertical intersection that gives a direct view from the second rail track to a first rail track, allowing for transport or deployment of goods by a mobile actuating device (170), or any combination thereof to/from a mobile transporting device (160) of the first tier, and of any tier below the first tier, wherein the movement of mobile actuating devices (170) or mobile transporting devices (160) or any combination thereof is fully automated, wherein a terminal (150) is provided that inputs and outputs boxes from the system.

\*   \*   \*   \*   \*